(12) United States Patent
Yamaguchi et al.

(10) Patent No.: US 12,481,168 B2
(45) Date of Patent: Nov. 25, 2025

(54) SEMICONDUCTOR LASER DEVICE AND METHOD OF CONTROLLING SEMICONDUCTOR LASER DEVICE

(71) Applicant: Panasonic Holdings Corporation, Osaka (JP)

(72) Inventors: Hideo Yamaguchi, Kyoto (JP); Masaharu Fukakusa, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 365 days.

(21) Appl. No.: 18/214,193

(22) Filed: Jun. 26, 2023

(65) Prior Publication Data

US 2023/0333396 A1    Oct. 19, 2023

Related U.S. Application Data

(63) Continuation of application No. PCT/JP2021/044364, filed on Dec. 2, 2021.

(30) Foreign Application Priority Data

Jan. 12, 2021  (JP) ................................ 2021-003074

(51) Int. Cl.
 *G02B 26/08* (2006.01)
 *G02B 27/10* (2006.01)
 *G02B 27/42* (2006.01)

(52) U.S. Cl.
 CPC ..... *G02B 27/1093* (2013.01); *G02B 26/0816* (2013.01); *G02B 27/4233* (2013.01)

(58) Field of Classification Search
 CPC ............ G02B 27/1093; G02B 26/0816; G02B 27/4233; G02B 26/08; G02B 26/10; H01S 5/022; H01S 5/14; H01S 5/40
 See application file for complete search history.

(56) References Cited

U.S. PATENT DOCUMENTS

2016/0276799 A1*  9/2016  Shoda ....................... G02F 1/37

FOREIGN PATENT DOCUMENTS

| JP | 2016-54295 | 4/2016 |
| JP | 2019-4121 | 1/2019 |

OTHER PUBLICATIONS

International Search Report (ISR) issued on Jan. 11, 2022 in International (PCT) Application No. PCT/JP2021/044364.

* cited by examiner

*Primary Examiner* — Euncha P Cherry
(74) *Attorney, Agent, or Firm* — Wenderoth, Lind & Ponack, L.L.P.

(57) ABSTRACT

A semiconductor laser device is controlled by a controller and includes a plurality of optical amplifiers that each emit a light beam, a diffraction grating that receives the light beam from each of the plurality of optical amplifiers, and a rotary mirror that is rotatable and is disposed in an optical path between the plurality of optical amplifiers and the diffraction grating. The controller rotates the rotary mirror in accordance with a current applied to the plurality of optical amplifiers, and an angle of incidence of the light beam on the diffraction grating changes in accordance with the current applied.

10 Claims, 15 Drawing Sheets

SEMICONDUCTOR LASER DEVICE AND METHOD OF CONTROLLING SEMICONDUCTOR LASER DEVICE

CROSS REFERENCE TO RELATED APPLICATIONS

This is a continuation application of PCT International Application No. PCT/JP2021/044364 filed on Dec. 2, 2021, designating the United States of America, which is based on and claims priority of Japanese Patent Application No. 2021-003074 filed on Jan. 12, 2021. The entire disclosures of the above-identified applications, including the specifications, drawings and claims are incorporated herein by reference in their entirety.

FIELD

The present disclosure relates to a semiconductor laser device and a method of controlling a semiconductor laser device.

BACKGROUND

Conventionally, a variety of products are processed with use of laser light emitted from a semiconductor laser device. There is a desire for such a semiconductor laser device that emits light at a higher output power to increase the processing quality.

The semiconductor laser device described in Patent Literature (PTL) 1 aims to achieve emission light of a higher output power by combining a plurality of light beams emitted from respective semiconductor laser elements of different emission wavelengths with use of a diffraction grating.

CITATION LIST

Patent Literature

PTL 1: Japanese Unexamined Patent Application Publication No. 2016-54295

SUMMARY

Technical Problem

In the semiconductor laser device described in PTL 1, the angles of incidence of the light beams on the diffraction grating are set in accordance with the wavelengths of these light beams, in order to optimize the efficiency of combining the plurality of light beams by the diffraction grating. However, the wavelength of a light beam that a semiconductor laser element emits changes in accordance with the current applied to that semiconductor laser element. Therefore, when the current applied to a semiconductor laser element is changed, the optimal angle of incidence of a light beam on a diffraction grating changes as well. Hence, when the current applied to each semiconductor laser element is changed, the efficiency of combining a plurality of light beams by a diffraction grating decreases.

The present disclosure is to address such circumstances and is directed to providing a semiconductor laser device and so on capable of keeping the efficiency of combining a plurality of light beams by a diffraction grating from decreasing.

Solution to Problem

To solve the problem described above, one aspect of a semiconductor laser device according to the present disclosure is a semiconductor laser device that is controlled by a controller, and the semiconductor laser device includes: a plurality of optical amplifiers that each emit a light beam; a diffraction grating that receives the light beam from each of the plurality of optical amplifiers; and a rotary mirror that is rotatable and is disposed in an optical path between the plurality of optical amplifiers and the diffraction grating, wherein the controller rotates the rotary mirror in accordance with a current applied to the plurality of optical amplifiers, and an angle of incidence of the light beam on the diffraction grating changes in accordance with the current applied.

In addition, to solve the problem described above, one aspect of a method of controlling a semiconductor laser device according to the present disclosure is a method of controlling a semiconductor laser device that includes a plurality of optical amplifiers that each emit a light beam, a diffraction grating that receives the light beam from each of the plurality of optical amplifiers, and a rotary mirror that is rotatable and is disposed in an optical path between the plurality of optical amplifiers and the diffraction grating, and the method of controlling the semiconductor laser device includes: determining a current to be applied to the plurality of optical amplifiers; and rotating the rotary mirror in accordance with the current applied, wherein an angle of incidence of the light beam on the diffraction grating changes in accordance with the current applied.

Advantageous Effects

The present disclosure can provide a semiconductor laser device and so on capable of keeping the efficiency of combining a plurality of light beams by a diffraction grating from decreasing.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, some embodiments of the present disclosure will be described with reference to the drawings. It is to be noted that the embodiments described below merely illustrate specific examples of the present disclosure. Therefore, the numerical values, the shapes, the materials, the constituent elements, the arrangement positions and the connection modes of the constituent elements, and so on illustrated according to the following embodiments are merely examples and are not intended to limit the present disclosure.

Furthermore, the drawings are schematic diagrams and do not necessarily provide the exact depictions. Hence, the scales and so on do not necessarily match among the drawings. In the appended drawings, substantially identical components are given identical reference signs, and duplicate description thereof will be omitted or simplified.

In the present specification, the terms "above" and "under" are used not only as terms that indicate, respectively, an upward direction (vertically above) and a downward direction (vertically under) in the sense of absolute spatial recognition but also as terms that define relative positional relationships based on the order in which layers are stacked on top of each other in a layered structure. Furthermore, the terms "above" and "under" are adopted not only in a case in which two constituent elements in question are disposed with a space provided therebetween and with another constituent element interposed between these two constituent elements but also in a case in which two constituent elements in question are disposed so as to be in contact with each other.

Embodiment 1

A semiconductor laser device according to Embodiment 1 and a method of controlling the semiconductor laser device will be described.

[1-1. Overall Configuration]

Figure 1:
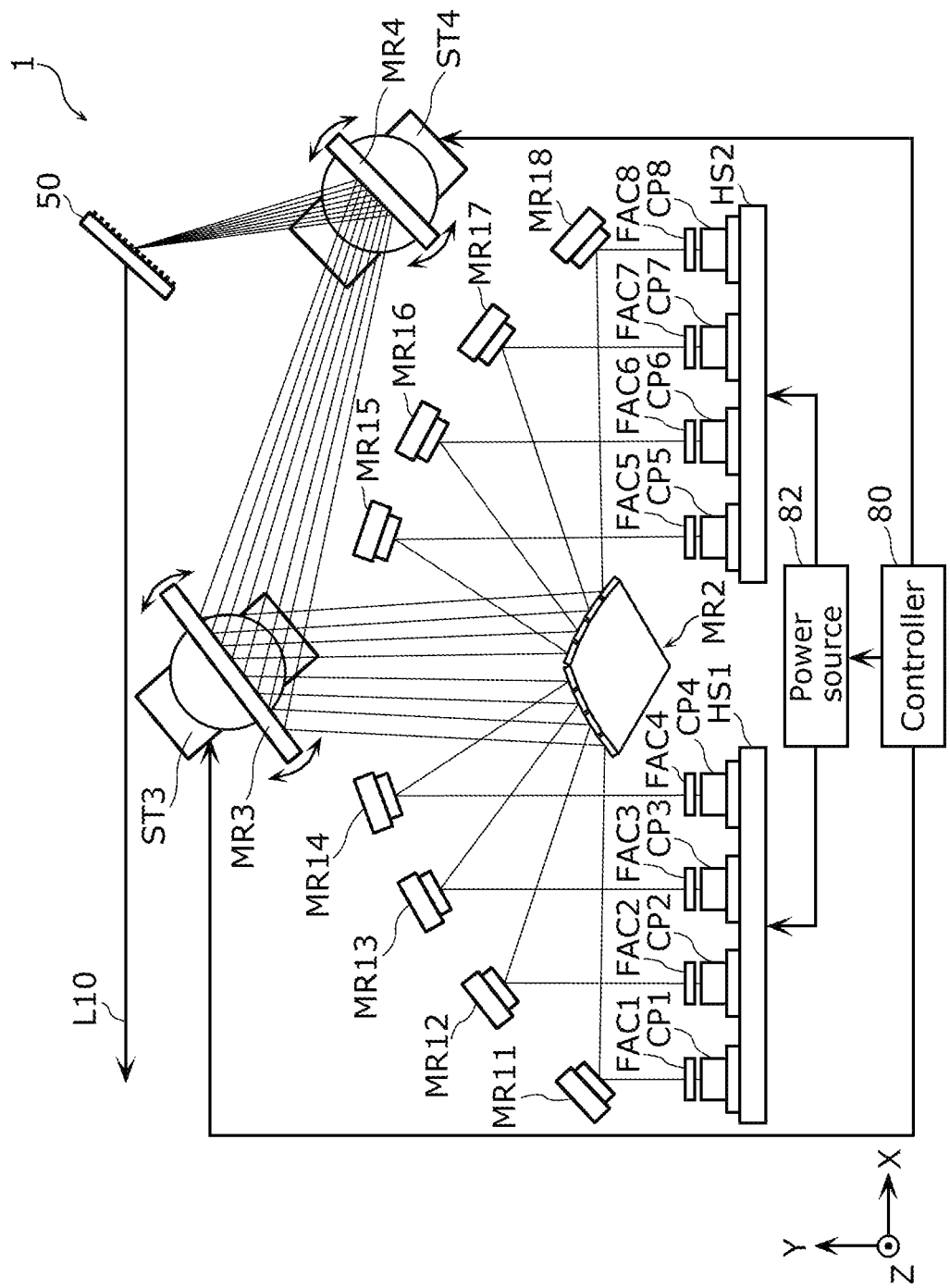
FIG. 1 is a schematic diagram illustrating an overall configuration of a semiconductor laser device according to Embodiment 1.

First, an overall configuration of a semiconductor laser device according to the present embodiment will be described with reference to FIG. 1. FIG. 1 is a schematic diagram illustrating an overall configuration of semiconductor laser device 1 according to the present embodiment. FIG. 1 and the drawings described below show the X axis, the Y axis, and the Z axis that are orthogonal to one another.

Semiconductor laser device 1 according to the present embodiment is a device that combines a plurality of light beams by diffraction grating 50 and outputs the combined light beam. As illustrated in FIG. 1, semiconductor laser device 1 includes a plurality of laser modules CP1 to CP8, first mirrors MR11 to MR18, second mirror MR2, third mirror MR3, fourth mirror MR4, and diffraction grating 50. According to the present embodiment, semiconductor laser device 1 further includes controller 80, power source 82, driving devices ST3 and ST4, fast axis collimator lenses FAC1 to FACE, and heat sinks HS1 and HS2.

Each of laser modules CP1 to CP8 is a module that includes a semiconductor laser element. According to the present embodiment, each of laser modules CP1 to CP8 includes a CAN package and a semiconductor laser element. laser modules CP1 to CP4 are disposed on heat sink HS1, and laser modules CP5 to CP8 are disposed on heat sink HS2. With this configuration, heat produced in laser modules CP1 to CP8 can be dissipated to heat sinks HS1 and HS2. There is no particular limitation on the configuration of heat sinks HS1 and HS2. Heat sinks HS1 and HS2, for example, may be each a heat dissipation plate formed by a plate-like metal member or the like.

Figure 2:
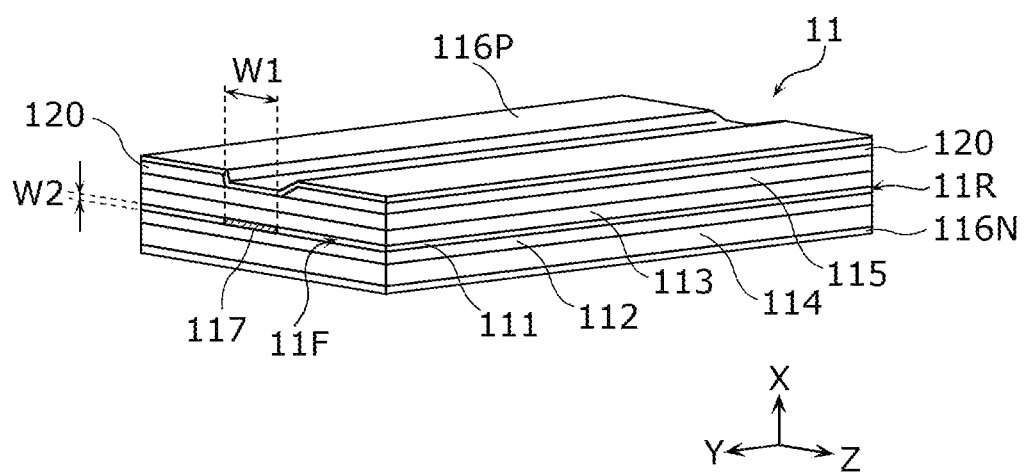
FIG. 2 is a schematic perspective view illustrating one example of a configuration of a semiconductor laser element according to Embodiment 1.
Figure 3:
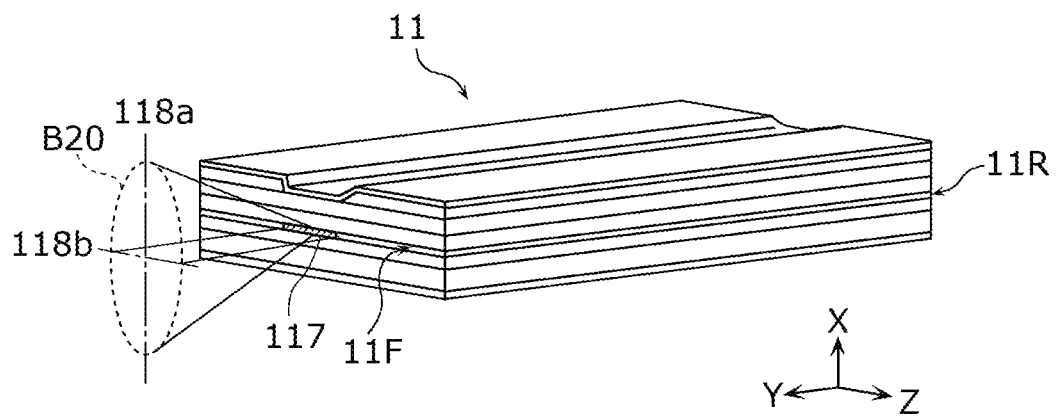
FIG. 3 is a schematic diagram illustrating a fast axis direction and a slow axis direction of a light beam emitted by a semiconductor laser element according to Embodiment 1.

A semiconductor laser element included in each of laser modules CP1 to CP8 will be described with reference to FIG. 2 and FIG. 3. FIG. 2 is a schematic perspective view illustrating one example of a configuration of semiconductor laser element 11 according to the present embodiment. FIG. 3 is a schematic diagram illustrating a fast axis direction and a slow axis direction of a light beam emitted by semiconductor laser element 11 according to the present embodiment.

Semiconductor laser element 11 is one example of an optical amplifier that emits a light beam. As illustrated in FIG. 2, semiconductor laser element 11 includes substrate 114, N-type clad layer 112, active layer 111, P-type clad layer 113, contact layer 115, electrodes 116P and 116N, and insulation layer 120.

Substrate 114 is a plate-like substrate having a semiconductor layer laminated on its one principal surface and having electrode 116N disposed on its other principal surface. According to the present embodiment, substrate 114 is an N-type semiconductor substrate. N-type clad layer 112 is an N-type semiconductor layer disposed above substrate 114. N-type clad layer 112 has a refractive index lower than the refractive index of active layer 111. Active layer 111 is a light emission layer disposed above N-type clad layer 112. P-type clad layer 113 is a P-type semiconductor layer disposed above active layer 111. P-type clad layer 113 has a refractive index lower than the refractive index of active layer 111. Contact layer 115 is a P-type semiconductor layer that forms an ohmic contact with electrode 116P.

Insulation layer 120 is a dielectric layer that provides electrical insulation between electrode 116P and contact layer 115. A slit that extends in the Y axis direction is formed at the center of insulation layer 120. Contact layer 115 and electrode 116P are in contact with each other within the slit in insulation layer 120. This configuration forms a current injection region in which a current is injected from electrode 116P to contact layer 115. According to the present embodiment, a current injection region that extends in the Y axis direction is formed. A current is injected into active layer 111 disposed under the slit in insulation layer 120. The region within active layer 111 into which a current is injected forms light emission region 117.

Dimension W1 of light emission region 117 in the Z axis direction (i.e., in the direction parallel to the principal surfaces of active layer 111 and perpendicular to the lengthwise direction of the current injection region) is greater than dimension W2 of light emission region 117 in the X axis direction (i.e., in the direction in which active layer 111 is laminated). In semiconductor laser element 11, the Z axis direction is referred to as a slow axis direction, and the X axis direction is referred to as a fast axis direction. In FIG. 3, axis 118a corresponds to the fast axis, and axis 118b corresponds to the slow axis. As illustrated in FIG. 3, the divergent angle in the fast axis direction of the light beam emitted from light emission region 117 is greater than its divergent angle in the slow axis direction. Therefore, the shape of the section of light beam B20 emitted from light emission region 117 is elliptical, as illustrated FIG. 3.

One of the end surfaces of semiconductor laser element 11 in the Y axis direction is front-side end surface 11F, and the other end surface of semiconductor laser element 11 is rear-side end surface 11R. Front-side end surface 11F is an end surface having a low optical reflectance, and a light beam is emitted from light emission region 117 on front-side end surface 11F. The reflectance of front-side end surface 11F is, for example, lower than or equal to 10%. A dielectric multilayer film or the like may be formed on front-side end surface 11F in order to reduce the reflectance with respect to a light beam emitted from light emission region 117. Rear-side end surface 11R is an end surface having an optical reflectance higher than the optical reflectance of front-side end surface 11F. The reflectance of rear-side end surface 11R is, for example, higher than or equal to 90%. A dielectric multilayer film or the like may be formed on rear-side end surface 11R in order to increase the reflectance with respect to a light beam emitted from light emission region 117.

Semiconductor laser elements 11 included in respective laser modules CP1 to CP8 illustrated in FIG. 1 emit light beams of different wavelengths. Any two adjacent semiconductor laser elements 11 in laser modules CP1 to CP8 emit light beams at wavelengths that differ, for example, by a few nanometers. The wavelength of a light beam emitted by each semiconductor laser element 11 is set to, for example, longer than or equal to about 390 nm and shorter than or equal to about 450 nm.

There is no particular limitation on semiconductor materials that form the semiconductor layers of each semiconductor laser element 11. Examples of semiconductor materials that can be used include a nitride-based semiconductor.

Referring back to FIG. 1, laser modules CP1 to CP8 are disposed linearly and next to each other in the X axis direction. First mirrors MR11 to MR18 are disposed at certain distances in the Y axis direction from respective laser modules CP1 to CP8. First mirrors MR11 to MR18 are disposed at positions where first mirrors MR11 to MR18 oppose front-side end surfaces 11F of respective semiconductor laser elements 11 included in laser modules CP1 to CP8. In other words, first mirrors MR11 to MR18 are disposed in optical axes of light beams emitted from respective semiconductor laser elements 11 included in laser modules CP1 to CP8.

Fast axis collimator lenses FAC1 to FAC8 are disposed in respective optical axes between laser modules CP1 to CP8 and first mirrors MR11 to MR18. Each of fast axis collimator lenses FAC1 to FAC8 is one example of a collimator lens that collimates a light beam emitted from each of the plurality of optical amplifiers, and fast axis collimator lenses FAC1 to FAC8 keep the light beams from diverging in the fast axis direction. With this configuration, the light beams emitted from laser modules CP1 to CP8 and transmitted through fast axis collimator lenses FAC1 to FAC8 become incident on respective first mirrors MR11 to MR18. Specifically, fast axis collimator lenses FAC1 to FAC8 are disposed in the vicinity of respective laser modules CP1 to CP8. This configuration can regulate the size in the fast axis direction of the light beams emitted from laser modules CP1 to CP8. Cylindrical lenses, for example, can be used as fast axis collimator lenses FAC1 to FAC8.

Herein, slow axis collimator lenses, which serve as another example of collimator lenses that collimate light beams emitted from the respective optical amplifiers, may be disposed, for example, in the respective optical axes between fast axis collimator lenses FAC1 to FAC8 and first mirrors MR11 to MR18. A slow axis collimator lens keeps a light beam from diverging in the slow axis direction.

First mirrors MR11 to MR18 have each a flat reflective surface and are disposed so as to be inclined with respect to the respective optical axes. With this configuration, first mirrors MR11 to MR18 reflect the light beams from respective laser modules CP1 to CP8 toward second mirror MR2. First mirrors MR11 to MR14 are disposed so as to be cascaded in the Y axis direction, in order to keep first mirrors MR11 to MR14 from blocking light beams reflected by other first mirrors. As with first mirrors MR11 to MR14, first mirrors MR15 to MR18 are disposed so as to be cascaded in the Y axis direction.

First mirrors MR11 to MR14 are disposed such that their respective reflective surfaces are arrayed along a parabola in a plane parallel to the XY plane. In addition, first mirrors MR15 to MR18 are disposed such that their respective reflective surfaces are arrayed along a parabola in a plane parallel to the XY plane. Herein, a parabola is not limited to a parabola in a mathematically strict sense and encompasses a position slightly off the parabola. For example, a position that is off a parabola in a mathematically strict sense by a distance that is about the size of the reflective surface of each first mirror is also encompassed by the parabola.

The reflective surfaces of respective first mirrors MR11 to MR14 are inclined at different angles, and the reflective surfaces of respective first mirrors MR15 to MR18 are inclined at different angles.

Figure 4:
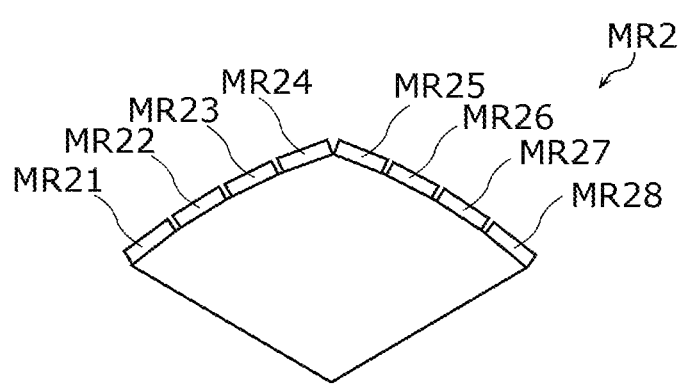
FIG. 4 is a schematic diagram illustrating a configuration of a second mirror according to Embodiment 1.

Second mirror MR2 is a mirror on which the light beams reflected by respective first mirrors MR11 to MR18 become incident and that reflects these light beams toward third mirror MR3. According to the present embodiment, the position of second mirror MR2 in the X axis direction lies between the position of laser module CP4 in the X axis direction and the position of laser module CP5 in the X axis direction. Now, a configuration of second mirror MR2 will be described with reference to FIG. 4. FIG. 4 is a schematic diagram illustrating a configuration of second mirror MR2 according to the present embodiment. As illustrated in FIG. 4, second mirror MR2 includes mirrors MR21 to MR28, in the same number as the number of laser modules CP1 to CP8. The light beams reflected by first mirrors MR11 to MR18 shown in FIG. 1 become incident on respective mirrors MR21 to MR28 of second mirror MR2 shown in FIG. 4. Mirrors MR21 to MR28 of second mirror MR2 are each a flat mirror and reflect the light beams incident thereon toward third mirror MR3. The reflective surfaces of respective mirrors MR21 to MR24 of second mirror MR2 are inclined at different angles, and the reflective surfaces of respective mirrors MR25 to MR28 of second mirror MR2 are inclined at different angles.

Referring back to FIG. 1, third mirror MR3 is a mirror on which the light beams reflected by mirrors MR21 to MR28 of second mirror MR2 become incident and that reflects these light beams toward fourth mirror MR4. Third mirror MR3 is, for example, a flat mirror. Third mirror MR3 is held by driving device ST3. Driving device ST3, by being controlled by controller 80, rotates third mirror MR3. As third mirror MR3 rotates, the angle of incidence of each light beam on the reflective surface of third mirror MR3 and the angle of reflection of each light beam from the reflective surface of third mirror MR3 change. Along with such changes, the angle of incidence of each light beam on fourth mirror MR4 also changes.

Fourth mirror MR4 is a mirror on which the light beams reflected by third mirror MR3 become incident and that reflects these light beams toward diffraction grating 50. The plurality of light beams reflected by fourth mirror MR4 become incident on diffraction grating 50 at different angles of incidence. Fourth mirror MR4 is, for example, a flat mirror. Fourth mirror MR4 is held by driving device ST4. Driving device ST4, by being controlled by controller 80, rotates fourth mirror MR4. As fourth mirror MR4 rotates, the angle of incidence of each light beam on the reflective surface of fourth mirror MR4 and the angle of reflection of each light beam from the reflective surface of fourth mirror MR4 change. Along with such changes, the angle of incidence of each light beam on diffraction grating 50 also changes.

As described above, third mirror MR3 is one example of a first rotary mirror that can be rotated and that is disposed in an optical path between the plurality of semiconductor laser elements 11, serving as the plurality of optical amplifiers, and diffraction grating 50. Fourth mirror MR4 is one example of a second rotary mirror that can be rotated and that is disposed in an optical path between the plurality of semiconductor laser elements 11, serving as the plurality of optical amplifiers, and diffraction grating 50.

Diffraction grating 50 is an optical element on which the light beams from the respective optical amplifiers become incident. The light beams from the respective optical amplifiers become incident on diffraction grating 50 at substantially the same position and are diffracted by diffraction grating 50. Diffraction grating 50 diffracts the incident light beams in accordance with their wavelengths. Therefore, as the angles of incidence are set appropriately in accordance with the wavelengths of the respective light beams, the light beams can be emitted from diffraction grating 50 at substantially the same emission angle (i.e., the same angle of diffraction). In other words, diffraction grating 50 can combine the plurality of light beams of different wavelengths. Specifically, the light beams from diffraction grating 50 have their optical axes aligned. This configuration produces emission light L10. According to the present embodiment, the plurality of light beams become incident on diffraction grating 50 such that the fast axis direction of each of the plurality of light beams matches the direction in which the lattices are arrayed in diffraction grating 50. Furthermore, the plurality of light beams are arrayed in the fast axis direction. This configuration can reduce the beam size of each of the plurality of light beams to be combined by diffraction grating 50 in the direction in which the lattices are arrayed. Herein, reducing the size of each light beam in the direction in which the lattices are arrayed in diffraction grating 50 can increase the efficiency of combining the light beams. Therefore, matching the fast axis direction in which the size of each light beam can be reduced with the direction in which the lattices are arrayed in diffraction grating 50 makes it possible to increase the efficiency of combining the plurality of light beams.

According to the present embodiment, a part of the light beams incident on diffraction grating 50 is diffracted to form emission light L10. Meanwhile, another part of the light beams incident on diffraction grating 50 is reflected and returns to semiconductor laser elements 11 via fourth mirror MR4, third mirror MR3, second mirror MR2, and first mirrors MR11 to MR18. In other words, diffraction grating 50 and rear-side end surfaces 11R of respective semiconductor laser elements 11 form external resonators, and the light beams oscillate inside these external resonators to form laser light beams. The wavelength of the light beam amplified in each semiconductor laser element 11 is determined by the angle of incidence of the light beam on diffraction grating 50 and the amplification gain characteristic of that semiconductor laser element 11 with respect to the wavelength. Therefore, laser light beams of different wavelengths are generated by respective semiconductor laser elements 11. In this manner, the light beams generated by respective semiconductor laser elements 11 are combined by diffraction grating 50, and the combined light beams are output as emission light L10 that includes the laser light beams of a plurality of wavelengths.

Power source 82 is a direct current power source that supplies electric power to each of laser modules CP1 to CP8. Specifically, power source 82 applies a direct current to each of semiconductor laser elements 11 included in respective laser modules CP1 to CP8. Eight semiconductor laser elements 11 included in respective laser modules CP1 to CP8 are, for example, connected electrically in series, and the same current is applied to these eight semiconductor laser elements 11. The current applied to semiconductor laser elements 11 from power source 82 is controlled by controller 80.

Controller 80 is a device that controls semiconductor laser device 1. Controller 80 controls power source 82 and driving devices ST3 and ST4. Specifically, by controlling power source 82, controller 80 controls the current applied to semiconductor laser elements 11, serving as the optical amplifiers. Meanwhile, by controlling driving devices ST3 and ST4, controller 80 controls the angles of rotation (i.e., the angles relative to the optical axes) of third mirror MR3 and fourth mirror MR4, serving as the rotary mirrors. Herein, that controller 80 rotates third mirror MR3 and fourth mirror MR4 by controlling driving devices ST3 and ST4 is also phrased as that controller 80 rotates third mirror MR3 and fourth mirror MR4. Controller 80 rotates third mirror MR3 and fourth mirror MR4, serving as the rotary mirrors, in accordance with the current applied to the plurality of semiconductor laser elements 11, serving as the plurality of optical amplifiers. The details of the control of semiconductor laser device 1 by controller 80 will be described later. Controller 80 can be implemented, for example, by a microcomputer. A microcomputer is a single-chip semiconductor integrated circuit that includes a memory, such as a read only memory (ROM) or a random access memory (RAM), storing a program; a processor (central processing unit (CPU)) that executes the program; a timer; and an input and output circuit that includes, for example, an analog-to-digital (A/D) converter or a digital-to-analog (D/A) converter. Herein, controller 80 may be implemented with use of, for example but not limited to, a personal computer or an electric circuit, other than a microcomputer.

[1-2. Relationship Between Applied Current and Emission Light]

Figure 5:
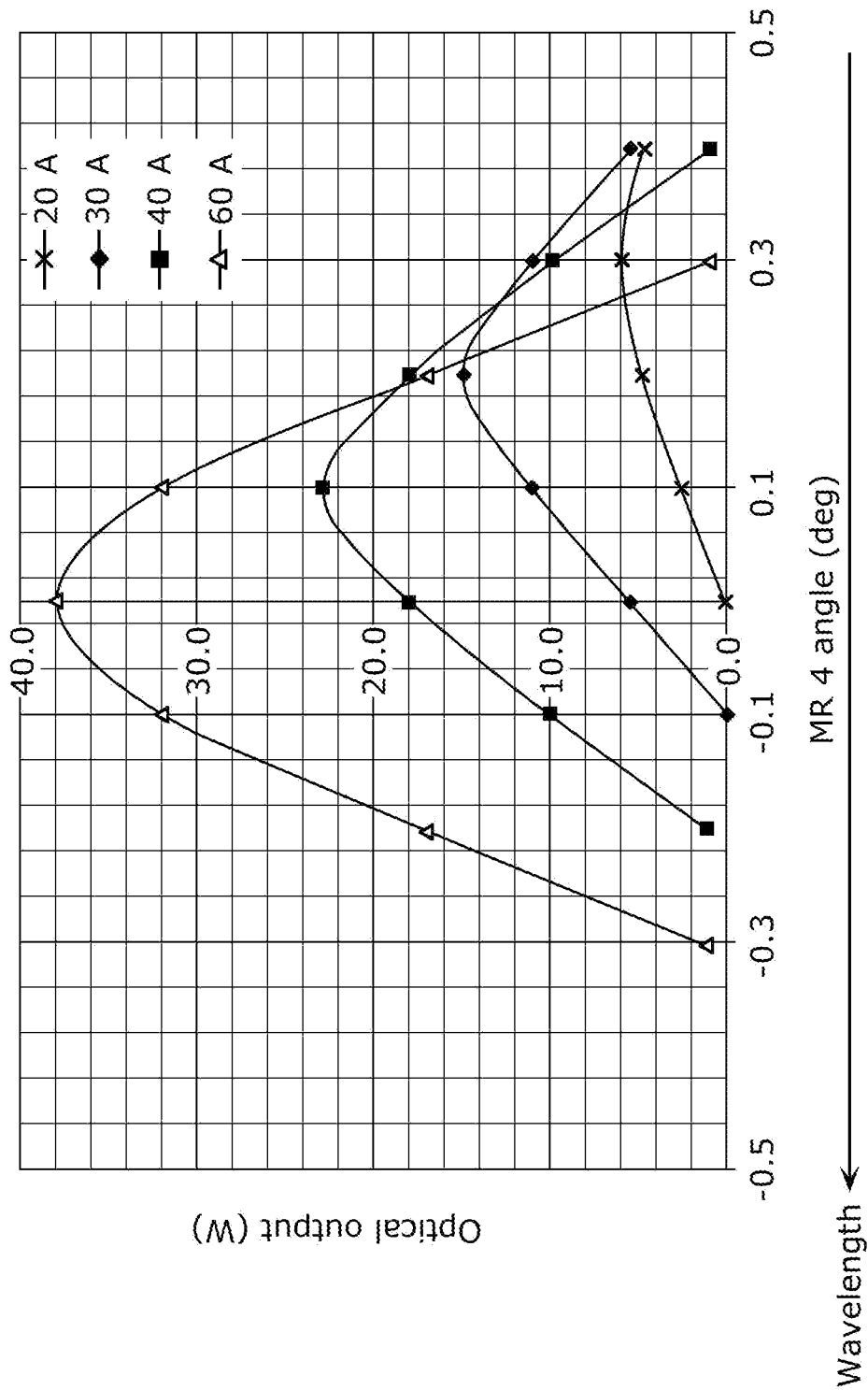
FIG. 5 is a graph illustrating a relationship between an optical output and the angle of rotation of a fourth mirror of a semiconductor laser device according to Embodiment 1.

Next, a relationship between emission light L10 and the current applied to the plurality of semiconductor laser elements 11 according to the present embodiment will be described with reference to FIG. 5. FIG. 5 is a graph illustrating a relationship between the optical output and the angle of rotation of fourth mirror MR4 of semiconductor laser device 1 according to the present embodiment. The graph shown in FIG. 5 includes lines corresponding to the respective cases in which the current applied to semiconductor laser elements 11 is 20 A, 30 A, 40 A, and 60 A. The horizontal axis of the graph shown in FIG. 5 represents the angle of rotation of fourth mirror MR4, and the vertical axis represents the optical output. Herein, the angle of rotation of fourth mirror MR4 shown along the horizontal axis is set such that the angle is zero degrees when the optical output is maximized with the applied current being 60 A.

As illustrated in FIG. 5, the angle of rotation of fourth mirror MR4 that maximizes the optical output changes in accordance with the applied current. A reason for this can be explained as follows. Specifically, as the temperature of semiconductor laser elements 11 rises with an increase in the applied current, the wavelengths of the light beams emitted from semiconductor laser elements 11, that is, the wavelength of amplified spontaneous emission (ASE) shifts toward the longer wavelength side. In other words, the optimal values of the angles of incidence of the plurality of light beams on diffraction grating 50 change in accordance with the wavelengths of the plurality of light beams from the plurality of semiconductor laser elements 11. Herein, the optimal values of the angles of incidence are the angles of incidence that maximize the efficiency of combining the plurality of light beams by diffraction grating 50. In the example illustrated in FIG. 5, the angle of rotation of fourth mirror MR4 that maximizes the optical output decreases as the wavelengths of the plurality of light beams become longer (see the wavelength axis shown below the horizontal axis in FIG. 5).

Controller 80 according to the present embodiment rotates third mirror MR3 and fourth mirror MR4, serving as the rotary mirrors, in accordance with the applied current. For example, controller 80 includes a table that indicates a relationship between the applied current and the angle of each rotary mirror that maximizes the optical output, and based on that table, controller 80 controls the angle of each rotary mirror in accordance with the applied current. With this configuration, the angle of incidence of each light beam on diffraction grating 50 changes in accordance with the applied current. Therefore, even in a case in which the applied current changes, the efficiency of combining the plurality of light beams by diffraction grating 50 can be kept from decreasing. To be more specific, the angle of incidence of each light beam on diffraction grating 50 increases as the applied current increases. In this manner, according to the present embodiment, the angles of incidence of the light beams on diffraction grating 50 increase with an increase in the wavelengths of the light beams from semiconductor laser elements 11 that occurs with an increase in the applied current. This configuration can suppress any decrease in the efficiency of combining the plurality of light beams by diffraction grating 50 that could occur with an increase in the wavelengths of the light beams.

Furthermore, according to the present embodiment, third mirror MR3 and fourth mirror MR4, serving as the rotary mirrors, change the angles of incidence at which the light beams become incident thereon, so that the angle of diffraction of the light beams from diffraction grating 50 can be maintained. With this configuration, the angle of diffraction is kept constant even if the wavelengths of the light beams change due to a change in the applied current, and thus the efficiency of combining the plurality of light beams by diffraction grating 50 can be kept from decreasing.

Figure 6:
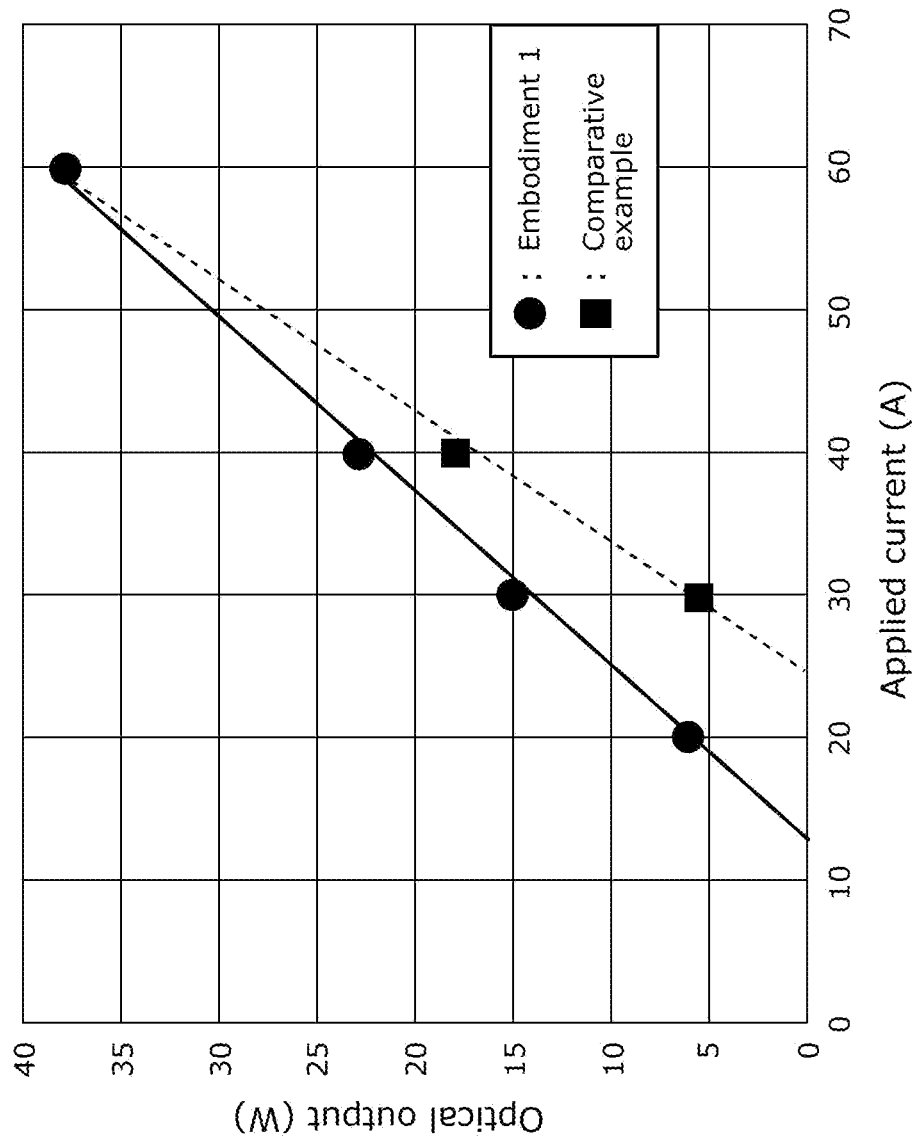
FIG. 6 is a graph illustrating a relationship between an optical output and a current applied to a plurality of optical amplifiers of a semiconductor laser device according to Embodiment 1.

These advantageous effects of semiconductor laser device 1 according to the present embodiment will be described with reference to FIG. 6. FIG. 6 is a graph illustrating a relationship between the optical output and the current applied to the plurality of optical amplifiers of semiconductor laser device 1 according to the present embodiment. FIG. 6 also shows a relationship between the optical output and the current applied to a semiconductor laser device according to a comparative example. The semiconductor laser device according to the comparative example is a semiconductor laser device that has a configuration similar to the configuration of semiconductor laser device 1 according to the present embodiment except in that the angles of rotation of third mirror MR3 and fourth mirror MR4 are fixed in the semiconductor laser device according to the comparative example to the angles that maximize the optical output with the applied current being 60 A.

Since the angle of fourth mirror MR4 is fixed in the semiconductor laser device according to the comparative example, the efficiency of combining a plurality of light beams by diffraction grating 50 decreases in cases other than the case in which the applied current is 60 A, and thus the maximum optical output shown in FIG. 5 cannot be obtained. In contrast, as fourth mirror MR4 is rotated in accordance with the applied current in semiconductor laser device 1 according to the present embodiment, the efficiency of combining a plurality of light beams by diffraction grating 50 can be kept from decreasing. Accordingly, as illustrated FIG. 6, the maximum optical output shown in FIG. 5 can be obtained in each of the cases of the applied currents.

Furthermore, as illustrated in FIG. 6, the optical output of about 6 W, for example, can be obtained with an applied current of about 20 A in semiconductor laser device 1 according to the present embodiment. The semiconductor laser device according to the comparative example, however, requires an applied current of about 30 A to obtain an optical output of about 6 W. In this manner, the present embodiment can keep the efficiency of combining light beams by diffraction grating 50 from decreasing and can thus reduce power consumption.

[1-3. Control Method]

Figure 7:
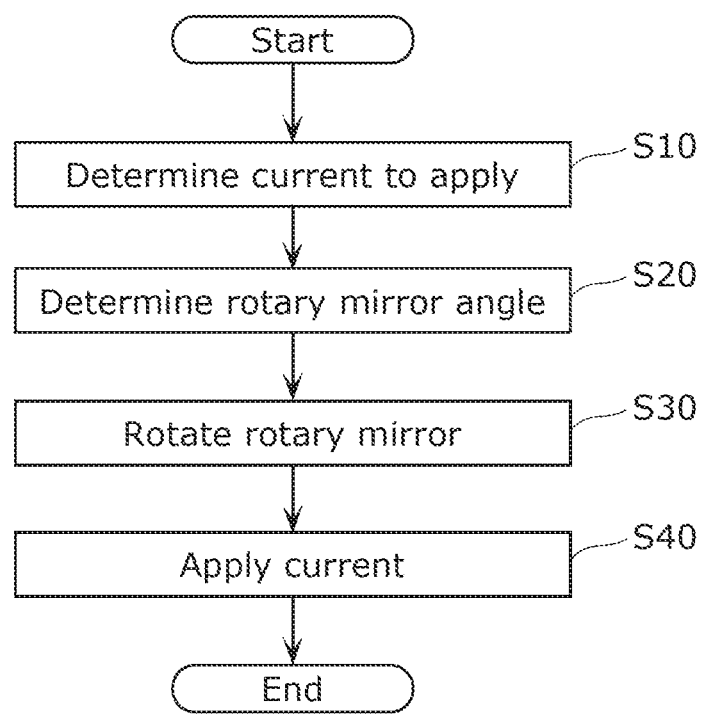
FIG. 7 is a flowchart illustrating a method of controlling a semiconductor laser device according to Embodiment 1.

Next, a method of controlling semiconductor laser device 1 according to the present embodiment will be described with reference to FIG. 7. FIG. 7 is a flowchart illustrating a method of controlling semiconductor laser device 1 according to the present embodiment.

As illustrated in FIG. 7, first, controller 80 determines the current to be applied to semiconductor laser elements 11, serving as the plurality of amplifiers (S10). Controller 80 determines the current to be applied based, for example, on a signal input from the outside by a user or the like.

Next, controller 80 determines the angle of each rotary mirror based on the current to be applied determined at step S10 (S20). To be more specific, controller 80 determines the angle of each rotary mirror (third mirror MR3 and fourth mirror MR4) such that the maximum optical output can be obtained with the current to be applied determined at step S10, based on the relationship between the applied current and the angle of each rotary mirror that maximizes the optical output.

Next, controller 80 rotates each rotary mirror such that the angles of the respective rotary mirrors match the angles of the rotary mirrors determined at step S20 (S30). To be more specific, by controlling driving device ST3, controller 80 rotates third mirror MR3 such that the angle of third mirror MR3 matches the angle of third mirror MR3 determined at step S20. Furthermore, by controlling driving device ST4, controller 80 rotates fourth mirror MR4 such that the angle of fourth mirror MR4 matches the angle of fourth mirror MR4 determined at step S20. With this operation, the angle of incidence of each light beam on diffraction grating 50 changes in accordance with the applied current.

Next, controller 80 applies the current to the plurality of semiconductor laser elements 11, serving as the plurality of optical amplifiers (S40). To be more specific, by controlling power source 82, controller 80 applies the current to be applied determined at step S10 to the plurality of semiconductor laser elements 11.

As described above, semiconductor laser device 1 according to the present embodiment can be controlled in accordance with the applied current so that the efficiency of combining light beams by diffraction grating 50 is kept from decreasing.

Embodiment 2

A semiconductor laser device according to Embodiment 2 and a method of controlling the semiconductor laser device will be described. The semiconductor laser device according to the present embodiment differs from semiconductor laser device 1 according to Embodiment 1 in that the semiconductor laser device according to the present embodiment includes a partial reflection mirror that functions as an output coupler. In the following, the semiconductor laser device according to the present embodiment and a method of controlling the semiconductor laser device will be described with reference to FIG. 8, with the description centered on the differences from Embodiment 1.

Figure 8:
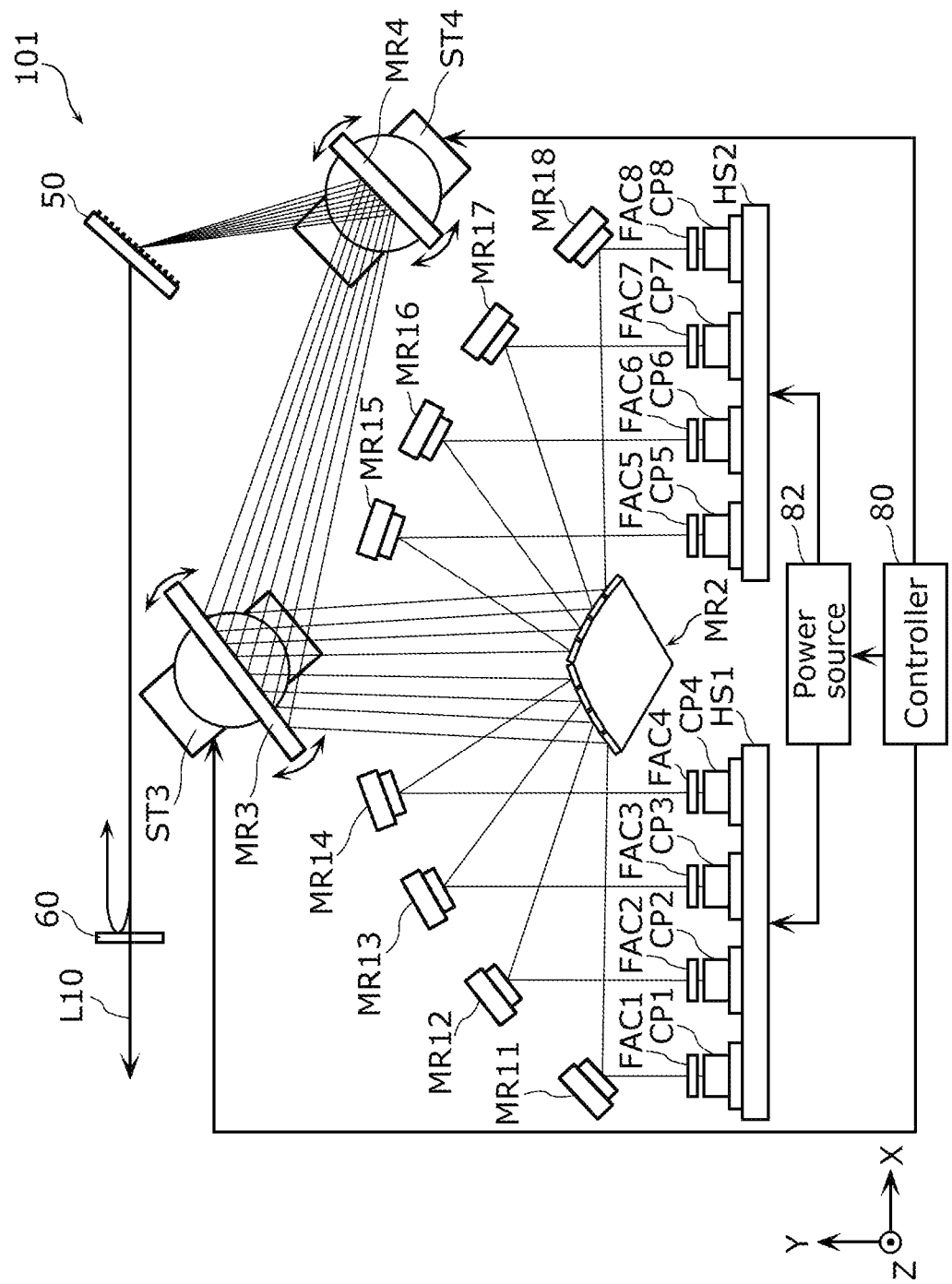
FIG. 8 is a schematic diagram illustrating an overall configuration of a semiconductor laser device according to Embodiment 2.

FIG. 8 is a schematic diagram illustrating an overall configuration of semiconductor laser device 101 according to the present embodiment. As illustrated in FIG. 8, semiconductor laser device 101 according to the present embodiment includes partial reflection mirror 60, in addition to constituent elements similar to the constituent elements of semiconductor laser device 1 according to Embodiment 1.

Partial reflection mirror 60 is a mirror that transmits a part of the light from diffraction grating 50 and reflects another part of that light. Partial reflection mirror 60 forms external resonators with rear-side end surfaces 11R of respective semiconductor laser elements 11 included in laser modules CP1 to CP8 of semiconductor laser device 101 and functions as an output coupler. Partial reflection mirror 60 is, for example, a flat mirror. Herein, partial reflection mirror 60 may instead be a concave mirror.

Semiconductor laser device 101 according to the present embodiment provides advantageous effects similar to those provided by semiconductor laser device 1 according to Embodiment 1. Furthermore, since semiconductor laser device 101 according to the present embodiment includes partial reflection mirror 60 that functions as an output coupler, the flexibility in designing, for example, the reflectance or the curvature of the output coupler can be increased, as compared to a case in which diffraction grating 50 is used as an output coupler.

Embodiment 3

A semiconductor laser device according to Embodiment 3 and a method of controlling the semiconductor laser device will be described. The semiconductor laser device according to the present embodiment differs from semiconductor laser device 101 according to Embodiment 2 in that the semiconductor laser device according to the present embodiment includes a coupling optical system. In the following, the semiconductor laser device according to the present embodiment and a method of controlling the semiconductor laser device will be described with reference to FIG. 9, with the description centered on the differences from Embodiment 2.

Figure 9:
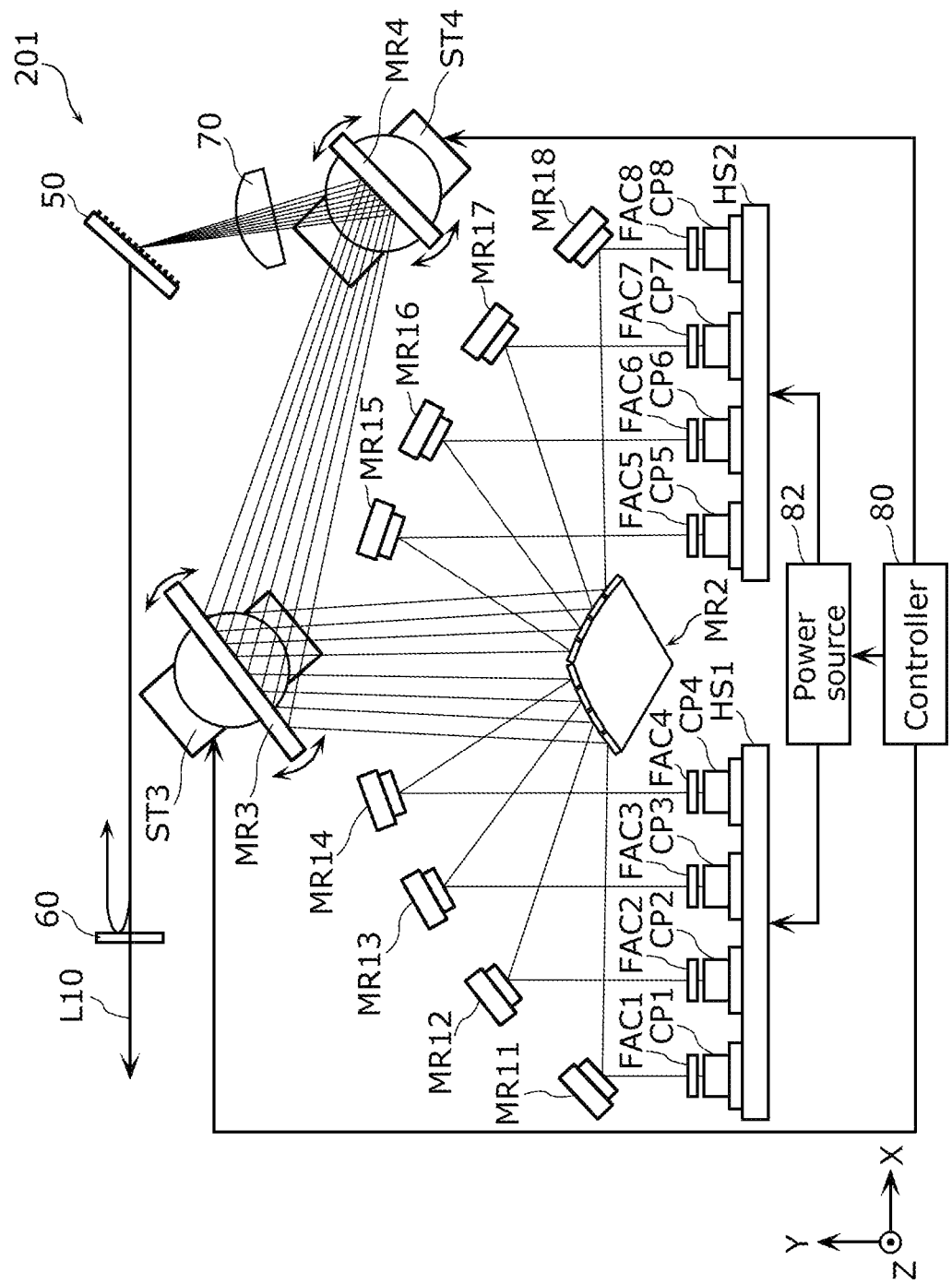
FIG. 9 is a schematic diagram illustrating an overall configuration of a semiconductor laser device according to Embodiment 3.

FIG. 9 is a schematic diagram illustrating an overall configuration of semiconductor laser device 201 according to the present embodiment. As illustrated in FIG. 9, semiconductor laser device 201 according to the present embodiment includes coupling optical system 70, in addition to constituent elements similar to the constituent elements of semiconductor laser device 101 according to Embodiment 2.

Coupling optical system 70 is an optical system that superposes light beams emitted from the plurality of semiconductor laser elements 11, serving as the plurality of optical amplifiers, on diffraction grating 50. Coupling optical system 70 is disposed in an optical path between the plurality of optical amplifiers and diffraction grating 50. According to the present embodiment, coupling optical system 70 is a cylindrical lens and is disposed in an optical path between fourth mirror MR4 and diffraction grating 50.

Semiconductor laser device 201 according to the present embodiment provides advantageous effects similar to those provided by semiconductor laser device 101 according to Embodiment 2. Furthermore, as semiconductor laser device 201 according to the present embodiment includes coupling optical system 70, the flexibility in designing, for example, the configuration of each mirror or the optical path length between diffraction grating 50 and semiconductor laser elements 11 can be increased.

Embodiment 4

A semiconductor laser device according to Embodiment 4 and a method of controlling the semiconductor laser device will be described. The semiconductor laser device according to the present embodiment differs from semiconductor laser device 1 according to Embodiment 1 in that the semiconductor laser device according to the present embodiment includes a semiconductor laser array that serves as an optical amplifier. In the following, semiconductor laser device 301 according to the present embodiment and a method of controlling semiconductor laser device 301 will be described with reference to FIG. 10, with the description centered on the differences from Embodiment 1.

Figure 10:
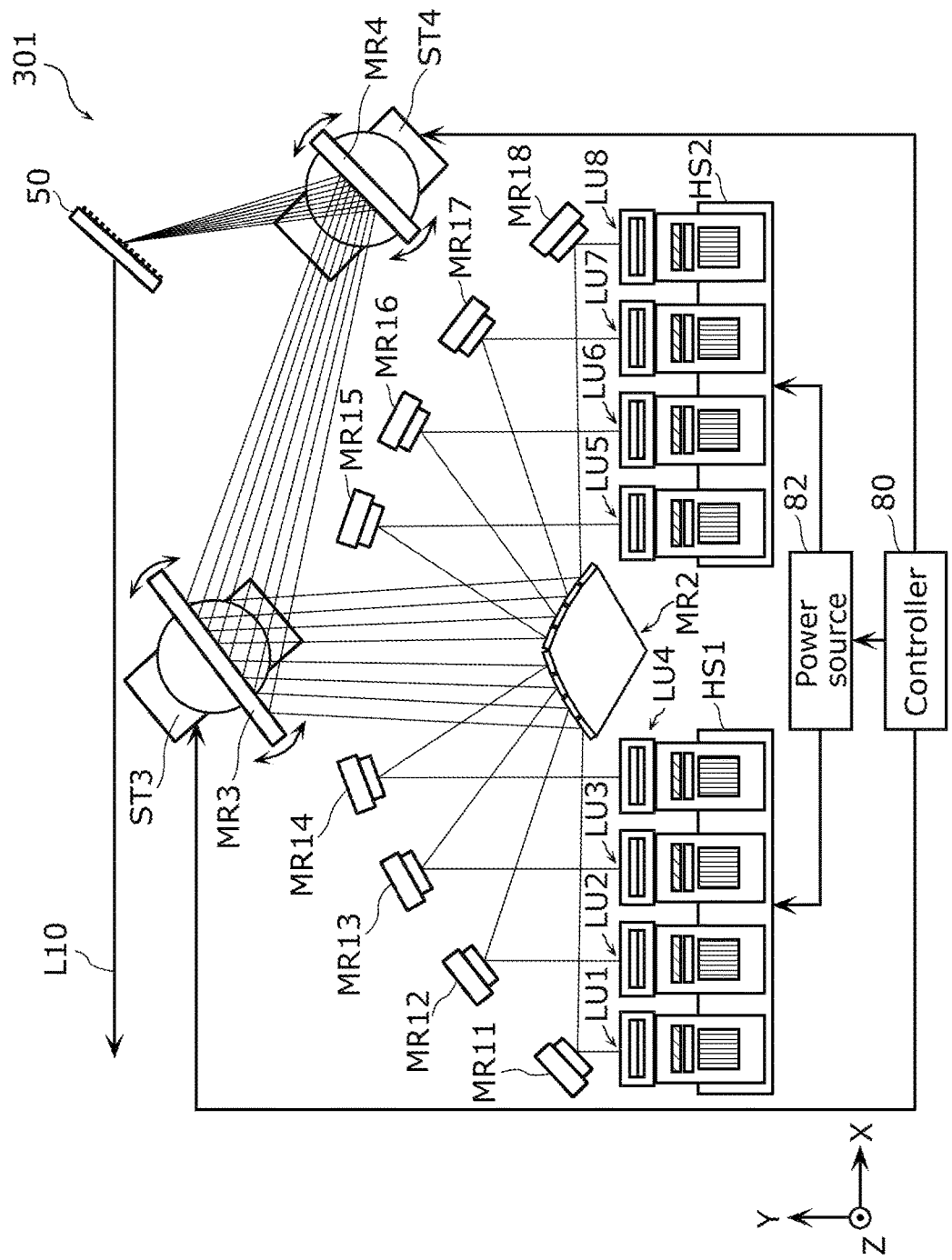
FIG. 10 is a schematic diagram illustrating an overall configuration of a semiconductor laser device according to Embodiment 4.

FIG. 10 is a schematic diagram illustrating an overall configuration of semiconductor laser device 301 according to the present embodiment. As illustrated in FIG. 10, semiconductor laser device 301 according to the present embodiment includes laser units LU1 to LU8, first mirrors MR11 to MR18, second mirror MR2, third mirror MR3, fourth mirror MR4, and diffraction grating 50. According to the present embodiment, semiconductor laser device 301 further includes controller 80, power source 82, driving devices ST3 and ST4, and heat sinks HS1 and HS2.

Figure 11:
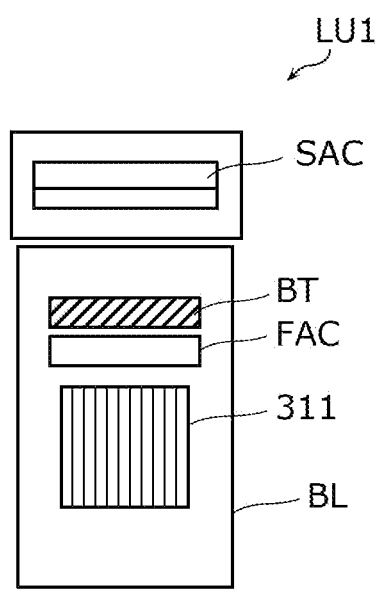
FIG. 11 is a schematic diagram illustrating a configuration of a laser unit according to Embodiment 4.

Laser units LU1 to LU8 according to the present embodiment will be described with reference to FIG. 11. FIG. 11 is a schematic diagram illustrating a configuration of laser unit LU1 according to the present embodiment. As illustrated in FIG. 11, laser unit LU1 includes semiconductor laser array 311, fast axis collimator lens FAC, 90-degree image rotating optical system BT, heat dissipation block BL, and slow axis collimator lens SAC.

Figure 12:
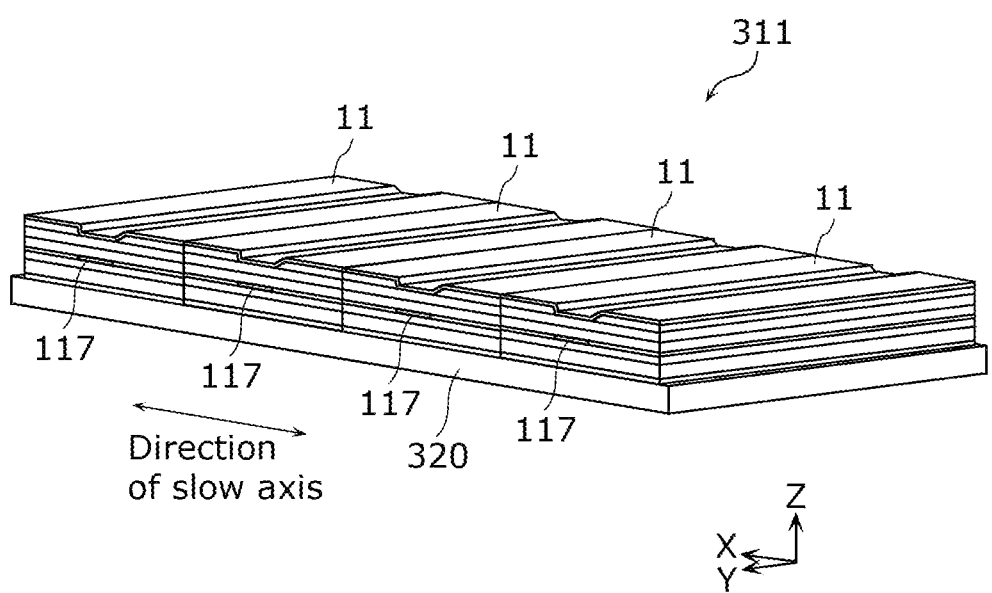
FIG. 12 is a schematic perspective view illustrating one example of a configuration of a semiconductor laser array according to Embodiment 4.

Semiconductor laser array 311 is a semiconductor light emitting element including a plurality of optical amplifiers. A configuration of semiconductor laser array 311 will be described with reference to FIG. 12. FIG. 12 is a schematic perspective view illustrating one example of a configuration of semiconductor laser array 311 according to the present embodiment. As illustrated in FIG. 12, semiconductor laser array 311 is an element in which a plurality of semiconductor laser elements 11 are arranged in an array. Each of the plurality of semiconductor laser elements 11 has a configuration similar to the configuration of semiconductor laser element 11 according to Embodiment 1. Semiconductor laser array 311 includes a plurality of light emission regions 117 arrayed in the slow axis direction. According to the present embodiment, the plurality of semiconductor laser elements 11 are disposed on common substrate 320. Although FIG. 12 illustrates an example in which semiconductor laser array 311 includes four semiconductor laser elements 11, the number of semiconductor laser elements 11 included in semiconductor laser array 311 is not limited to four. It suffices that two or more semiconductor laser elements 11 be included in semiconductor laser array 311. Furthermore, in semiconductor laser array 311, the plurality of semiconductor laser elements 11 may be formed integrally or may be separate from each other.

Referring back to FIG. 11, fast axis collimator lens FAC is one example of a collimator lens that collimates a light beam emitted from an optical amplifier, and fast axis collimator lens FAC keeps a light beam from diverging in the fast axis direction. According to the present embodiment, fast axis collimator lens FAC keeps a light beams emitted from semiconductor laser element 11 serving as an optical amplifier from diverging in the fast axis direction. A cylindrical lens, for example, can be used as fast axis collimator lens FAC.

90-degree image rotating optical system BT is an optical system that is disposed in an optical path between fast axis collimator lens FAC and diffraction grating 50 and that switches between the fast axis direction and the slow axis direction of the light beam from fast axis collimator lens FAC. 90-degree image rotating optical system BT switches between the fast axis direction and the slow axis direction of the light beam by rotating the image of the incident light beam by 90 degrees about the optical axis. As semiconductor laser device 301 according to the present embodiment includes 90-degree image rotating optical system BT, semiconductor laser device 301 can convert a plurality of light beams arrayed in the slow axis direction to a plurality of light beams arrayed in the fast axis direction. This configuration makes it possible to array a plurality of light beams in the fast axis direction. Accordingly, the direction in which a plurality of light beams are arrayed and the fast axis direction of the light beams can be made to match the direction in which the lattices are arrayed in diffraction grating 50. This configuration can increase the efficiency of combining a plurality of light beams by diffraction grating 50, as described according to Embodiment 1.

Slow axis collimator lens SAC is one example of a lens that collimates a light beam emitted from an optical amplifier, and slow axis collimator lens SAC keeps a light beam from diverging in the slow axis direction. According to the present embodiment, slow axis collimator lens SAC keeps a light beam emitted from 90-degree image rotating optical system BT from diverging in the slow axis direction. A cylindrical lens, for example, can be used as slow axis collimator lens SAC.

Heat dissipation block BL is a metal block in which semiconductor laser array 311 is disposed, and heat dissipation block BL dissipates heat produced in semiconductor laser array 311. Heat dissipation block BL is formed, for example, of a metal having a high thermal conductivity, such as copper.

Laser units LU2 to LU8 shown in FIG. 10 each have a configuration similar to the configuration of laser unit LU1 shown in FIG. 11. Laser units LU1 to LU4 are disposed on heat sink HS1, and laser units LU5 to LU8 are disposed on heat sink HS2.

A current is applied to semiconductor laser array 311 included in each of laser units LU1 to LU8 from power source 82, as the current is applied to semiconductor laser elements 11 included in respective laser modules CP1 to CP8 according to Embodiment 1.

As semiconductor laser device 301 according to the present embodiment is configured as described above, semiconductor laser device 301 provides advantageous effects similar to those provided by semiconductor laser device 1 according to Embodiment 1. Furthermore, semiconductor laser device 301 according to the present embodiment includes a plurality of semiconductor laser arrays 311, and the plurality of semiconductor laser elements 11 in each semiconductor laser array 311 are used as the plurality of optical amplifiers. This configuration makes it possible to dispose the optical amplifiers at a high density. Accordingly, semiconductor laser device 301 of a reduced size and of a higher output power can be achieved.

Embodiment 5

A semiconductor laser device according to Embodiment 5 and a method of controlling the semiconductor laser device will be embodiment differs from semiconductor laser device 301 according to Embodiment 4 in that the semiconductor laser device according to the present embodiment includes a partial reflection mirror that functions as an output coupler. In the following, the semiconductor laser device according to the present embodiment and a method of controlling the semiconductor laser device will be described with reference to FIG. 13, with the description centered on the differences from Embodiment 4.

Figure 13:
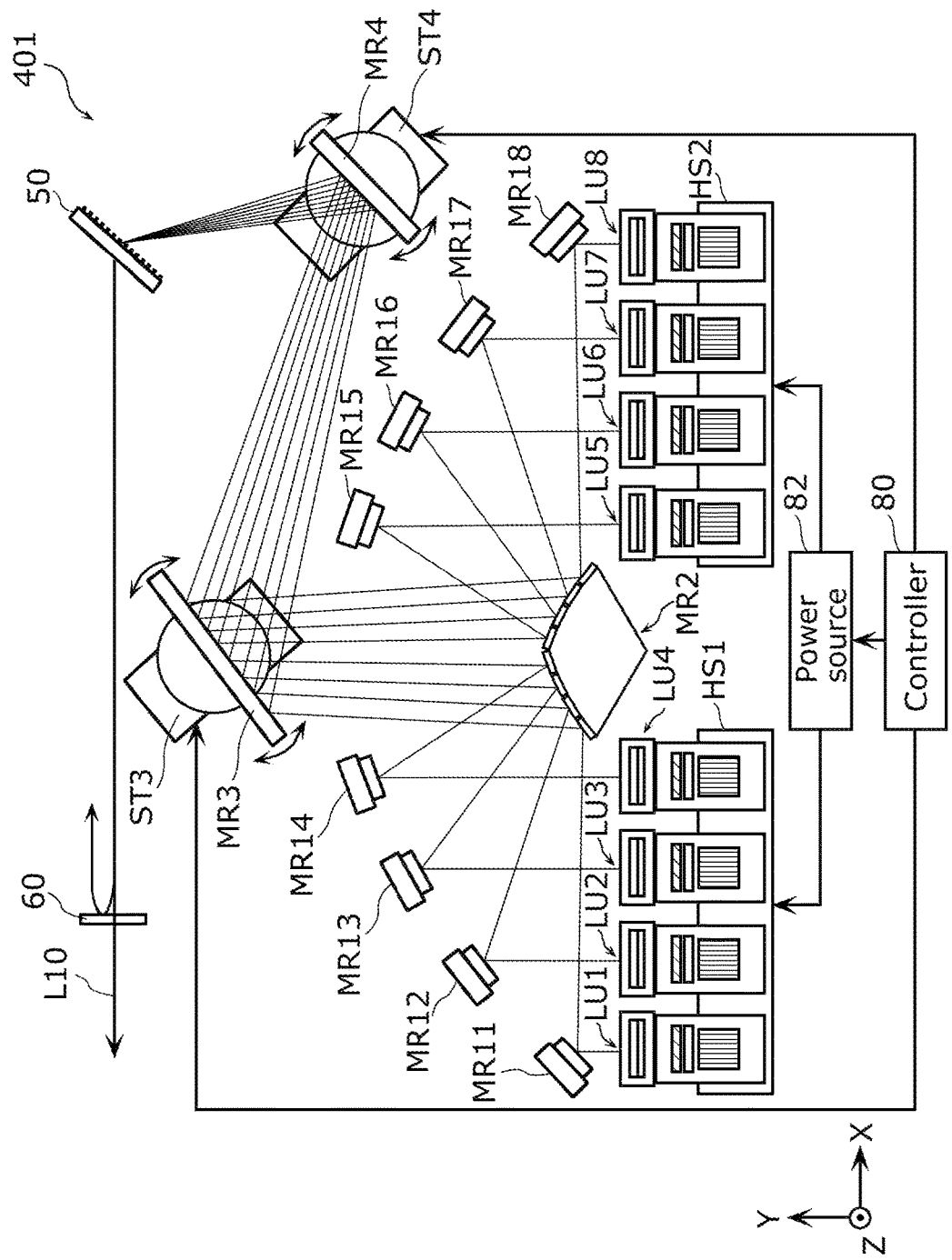
FIG. 13 is a schematic diagram illustrating an overall configuration of a semiconductor laser device according to Embodiment 5.

FIG. 13 is a schematic diagram illustrating an overall configuration of semiconductor laser device 401 according to the present embodiment. As illustrated in FIG. 13, semiconductor laser device 401 according to the present embodiment includes partial reflection mirror 60, in addition to constituent elements similar to the constituent elements of semiconductor laser device 301 according to Embodiment 4.

As with partial reflection mirror 60 according to Embodiment 2, partial reflection mirror 60 is a mirror that transmits a part of the light from diffraction grating 50 and reflects another part of that light. Partial reflection mirror 60 forms external resonators with rear-side end surfaces 11R of respective semiconductor laser elements 11 included in laser units LU1 to LU8 of semiconductor laser device 401 and functions as an output coupler.

Semiconductor laser device 401 according to the present embodiment provides advantageous effects similar to those provided by semiconductor laser device 301 according to Embodiment 4. Furthermore, since semiconductor laser device 401 according to the present embodiment includes partial reflection mirror 60 that functions as an output coupler, the flexibility in designing, for example, the reflectance or the curvature of the output coupler can be increased, as compared to a case in which diffraction grating 50 is used as an output coupler.

Embodiment 6

A semiconductor laser device according to Embodiment 6 and a method of controlling the semiconductor laser device will be embodiment differs from semiconductor laser device 401 according to Embodiment 5 in that the semiconductor laser device according to the present embodiment includes a coupling optical system. In the following, the semiconductor laser device according to the present embodiment and a method of controlling the semiconductor laser device will be described with reference to FIG. 14, with the description centered on the differences from Embodiment 5.

Figure 14:
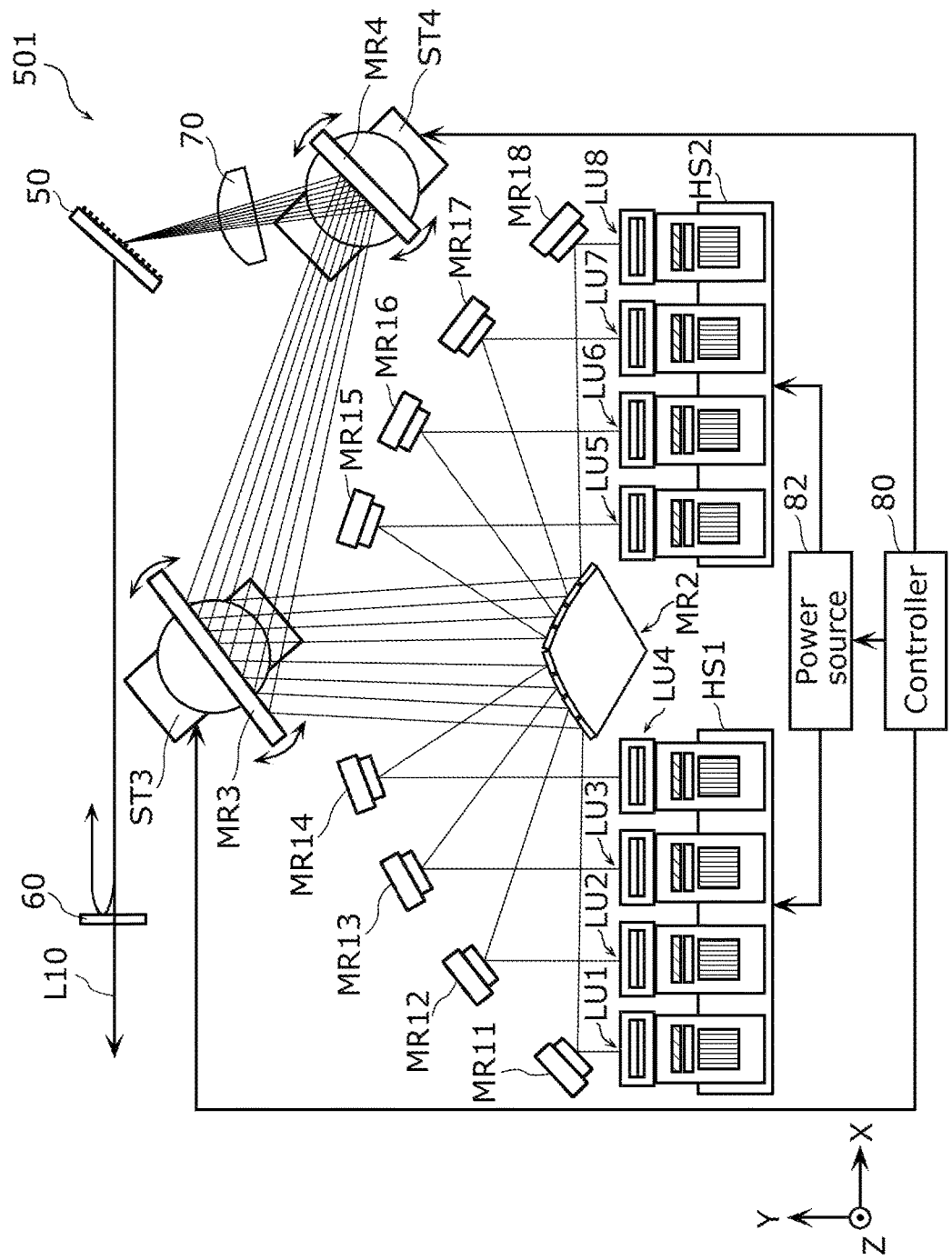
FIG. 14 is a schematic diagram illustrating an overall configuration of a semiconductor laser device according to Embodiment 6.

FIG. 14 is a schematic diagram illustrating an overall configuration of semiconductor laser device 501 according to the present embodiment. As illustrated in FIG. 14, semiconductor laser device 501 according to the present embodiment includes coupling optical system 70, in addition to constituent elements similar to the constituent elements of semiconductor laser device 401 according to Embodiment 5.

As with coupling optical system 70 according to Embodiment 3, coupling optical system 70 is an optical system that superposes light beams emitted from the plurality of semiconductor laser elements 11, serving as the plurality of optical amplifiers, on diffraction grating 50. Coupling optical system 70 is disposed in an optical path between the plurality of optical amplifiers and diffraction grating 50. According to the present embodiment, coupling optical system 70 is a cylindrical lens and is disposed in an optical path between fourth mirror MR4 and diffraction grating 50.

Semiconductor laser device 501 according to the present embodiment provides advantageous effects similar to those provided by semiconductor laser device 401 according to Embodiment 5. Furthermore, as semiconductor laser device 501 according to the present embodiment includes coupling optical system 70, the flexibility in designing, for example, the configuration of each mirror or the optical path length between diffraction grating 50 and semiconductor laser arrays 311 can be increased.

Embodiment 7

A semiconductor laser device according to Embodiment 7 and a method of controlling the semiconductor laser device will be embodiment differs from semiconductor laser device 501 according to Embodiment 6 in that the semiconductor laser device according to the present embodiment mainly includes a single semiconductor laser array. In the following, the semiconductor laser device according to the present embodiment and a method of controlling the semiconductor laser device will be described with reference to FIG. 15, with the description centered on the differences from Embodiment 6.

Figure 15:
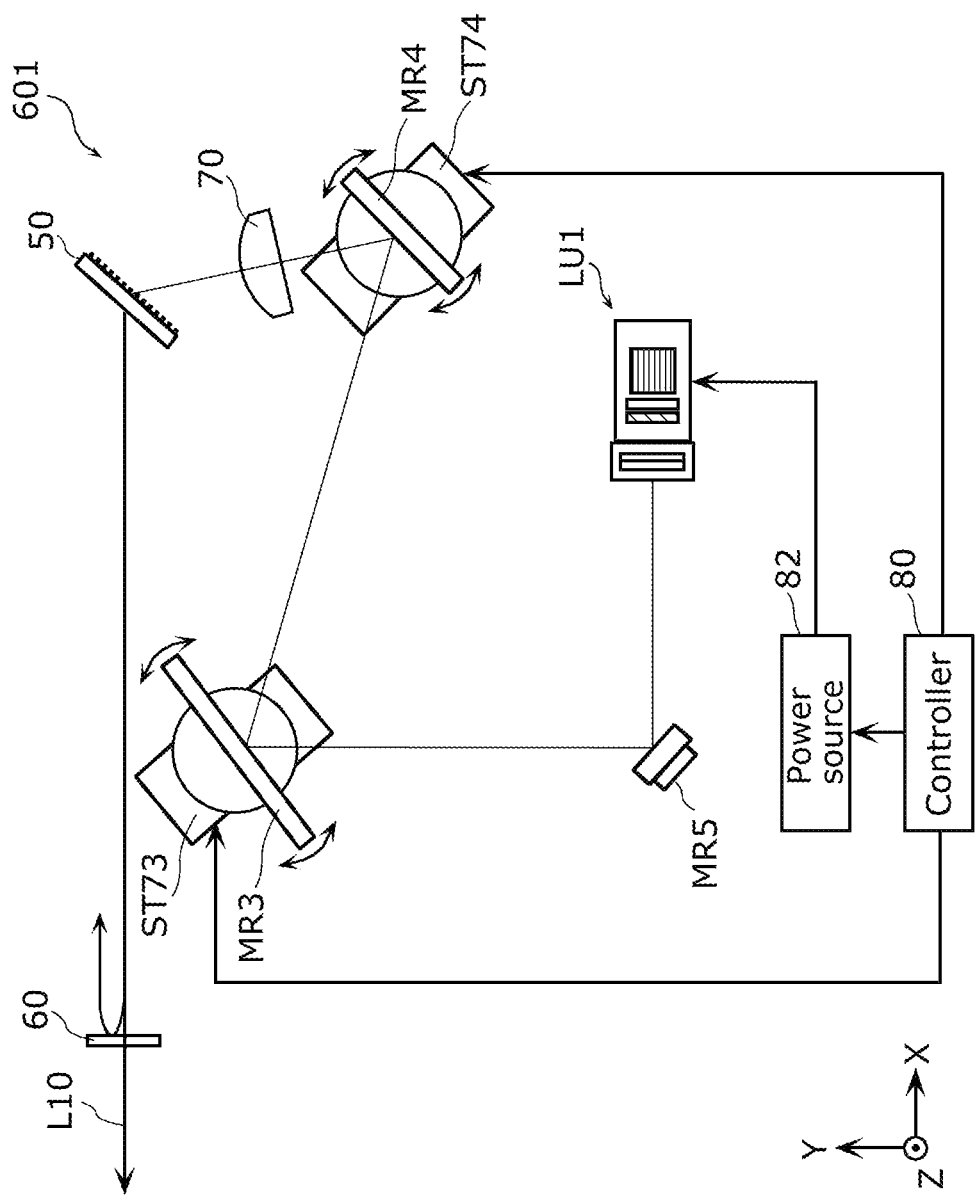
FIG. 15 is a schematic diagram illustrating an overall configuration of a semiconductor laser device according to Embodiment 7.

FIG. 15 is a schematic diagram illustrating an overall configuration of semiconductor laser device 601 according to the present embodiment. As illustrated in FIG. 15, semiconductor laser device 601 according to the present embodiment includes single laser unit LU1, mirror MR5, third mirror MR3, fourth mirror MR4, and diffraction grating 50. According to the present embodiment, semiconductor laser device 601 includes controller 80, power source 82, driving devices ST3 and ST4, partial reflection mirror 60, and coupling optical system 70.

Laser unit LU1 has a configuration similar to the configuration of laser unit LU1 according to any one of Embodiments 4 to 6. A current is applied to laser unit LU1 from power source 82.

Mirror MR5 is a mirror having a configuration similar to the configuration of, for example, any one of first mirrors MR11 to MR18 according to any one of Embodiments 1 to 6. Mirror MR5 receives a plurality of light beams emitted from laser unit LU1 and reflects the plurality of light beams toward third mirror MR3. Mirror MR5 is used to reduce the space to be occupied by semiconductor laser device 601. In other words, as semiconductor laser device 601 includes mirror MR5, the space can be used effectively. Herein, semiconductor laser device 601 does not need to include mirror MR5. Other constituent elements of semiconductor laser device 601 according to the present embodiment have configurations similar to the corresponding constituent elements of semiconductor laser device 501 according to Embodiment 6.

Semiconductor laser device 601 according to the present embodiment provides advantageous effects similar to those provided by semiconductor laser device 501 according to Embodiment 6.

Embodiment 8

A semiconductor laser device according to Embodiment 8 and a method of controlling the semiconductor laser device will be described. The semiconductor laser device according to the present embodiment differs from semiconductor laser device 501 according to Embodiment 6 in that the position on diffraction grating 50 at which a plurality of light beams are superposed on each other can be varied in the semiconductor laser device according to the present embodiment. In the following, the semiconductor laser device according to the present embodiment and a method of controlling the semiconductor laser device will be described with reference to FIG. 16, with the description centered on the differences from Embodiment 6.

Figure 16:
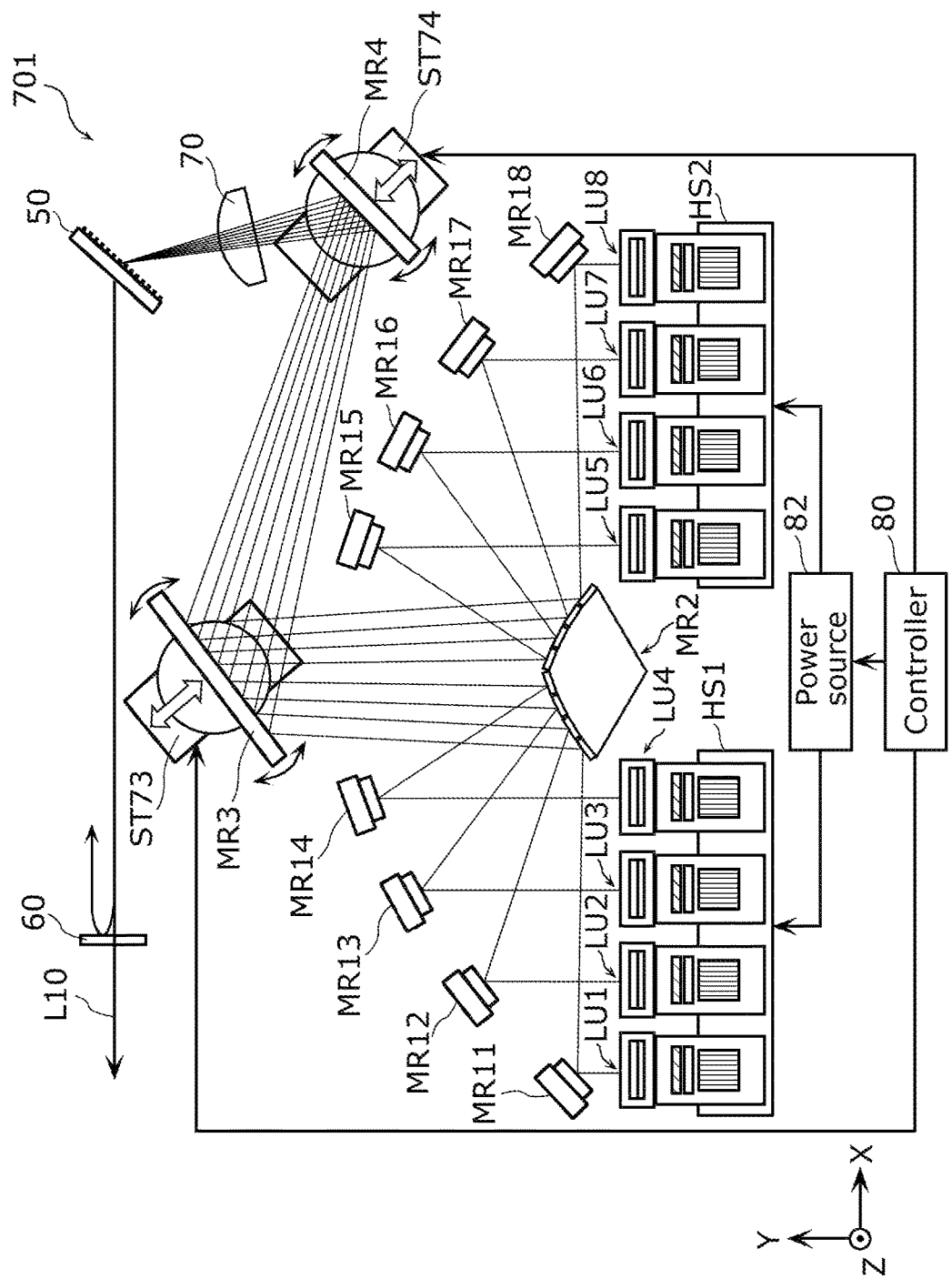
FIG. 16 is a schematic diagram illustrating an overall configuration of a semiconductor laser device according to Embodiment 8.

FIG. 16 is a schematic diagram illustrating an overall configuration of semiconductor laser device 701 according to the present embodiment. As illustrated in FIG. 16, semiconductor laser device 701 according to the present embodiment differs from semiconductor laser device 501 according to Embodiment 6 in the configuration of driving devices ST73 and ST74.

Driving device ST73, by being controlled by controller 80, rotates third mirror MR3 and moves the position of third mirror MR3. According to the present embodiment, driving device ST73 moves the position of third mirror MR3 in the optical axis direction. Driving device ST74, by being controlled by controller 80, rotates fourth mirror MR4 and moves the position of fourth mirror MR4. According to the present embodiment, driving device ST74 moves the position of fourth mirror MR4 in the optical axis direction.

In this manner, by controlling driving devices ST73 and ST74, controller 80 according to the present embodiment moves the positions of third mirror MR3 and fourth mirror MR4, serving as the rotary mirrors. Herein, that controller 80 moves the positions of third mirror MR3 and fourth mirror MR4 by controlling driving devices ST73 and ST74 is also phrased as that controller 80 moves the positions of third mirror MR3 and fourth mirror MR4.

According to the present embodiment, moving the positions of third mirror MR3 and fourth mirror MR4 makes it possible to move the position on diffraction grating 50 at which a plurality of light beams reflected by fourth mirror MR4 are superposed on each other. Although both the position of third mirror MR3 and the position of fourth mirror MR4 can be moved according to the present embodiment, only the position of one of third mirror MR3 or fourth mirror MR4 may be made movable.

As described above, according to the present embodiment, controller 80 moves the positions of the rotary mirrors, and the position on diffraction grating 50 at which the plurality of light beams emitted from the respective optical amplifiers are superposed on each other is moved with the movement of the positions of the rotary mirrors. An intense heat load is exerted on diffraction grating 50 according to the present embodiment at the position at which a plurality of light beams are superposed on each other, and thus diffraction grating 50 is susceptible to damage. However, since the present embodiment allows the position at which a plurality of light beams are superposed on each other to be moved, a situation in which an intense heat load continues to be exerted at a specific position on diffraction grating 50 can be avoided. Accordingly, damage to diffraction grating 50 can be reduced.

[Variations and Others]

Thus far, the semiconductor laser devices according to the present disclosure and the methods of controlling the semiconductor laser devices have been described based on the embodiments, but the present disclosure is not limited to the embodiments described above.

For example, although the semiconductor laser devices include controller 80 according to the foregoing embodiments, a semiconductor laser device does not need to include controller 80. In other words, controller 80 may control a semiconductor laser device from the outside of the semiconductor laser device.

Furthermore, although both third mirror MR3 and fourth mirror MR4 are rotated according to the foregoing embodiments, only one of third mirror MR3 or fourth mirror MR4 may be rotated. Furthermore, first mirrors MR11 to MR18, mirrors MR21 to MR28 of second mirror MR2, or mirror MR5, for example, may be rotated.

Furthermore, although a transmissive diffraction grating is used as diffraction grating 50 according to the foregoing embodiments, a reflective diffraction grating may instead be used as diffraction grating 50.

Furthermore, an embodiment obtained by making various modifications that a person skilled in the art can conceive of to the foregoing embodiments or an embodiment achieved by combining, as desired, the constituent elements and the functions of the foregoing embodiments within the scope that does not depart from the spirit of the present disclosure is also encompassed by the present disclosure.

INDUSTRIAL APPLICABILITY

A semiconductor laser device according to the present disclosure can be applied, for example, to a light source of a laser processing apparatus or the like as a light source of a high output power and of a high efficiency.

The invention claimed is:

1. A semiconductor laser device controlled by a controller, the semiconductor laser device comprising:
a plurality of optical amplifiers that each emit a light beam;
a diffraction grating that receives the light beam from each of the plurality of optical amplifiers; and
a rotary mirror that is rotatable and is disposed in an optical path between the plurality of optical amplifiers and the diffraction grating, wherein
the controller rotates the rotary mirror in accordance with a current applied to the plurality of optical amplifiers, and
an angle of incidence of the light beam on the diffraction grating changes in accordance with the current applied.

2. The semiconductor laser device according to claim 1, wherein
the angle of incidence on the diffraction grating increases with an increase in the current applied.

3. The semiconductor laser device according to claim 1, wherein
the rotary mirror changes the angle of incidence to retain an angle of diffraction of the light beam from the diffraction grating.

4. The semiconductor laser device according to claim 1, wherein
the controller moves a position of the rotary mirror, and
a position on the diffraction grating at which the light beam emitted from each of the plurality of optical amplifiers is superposed is moved with a movement of the position of the rotary mirror.

5. The semiconductor laser device according to claim 1, further comprising:
a coupling optical system that superposes the light beam emitted from each of the plurality of optical amplifiers on the diffraction grating, wherein
the coupling optical system is disposed in the optical path between the plurality of optical amplifiers and the diffraction grating.

6. The semiconductor laser device according to claim 1, further comprising:
one or more semiconductor laser arrays, wherein
the one or more semiconductor laser arrays include the plurality of optical amplifiers.

7. The semiconductor laser device according to claim 1, further comprising:
a collimator lens that collimates the light beam emitted from each of the plurality of optical amplifiers.

8. The semiconductor laser device according to claim 7, further comprising:
a 90-degree image rotating optical system that is disposed in an optical path between the collimator lens and the diffraction grating and switches between a fast axis direction and a slow axis direction of the light beam.

9. The semiconductor laser device according to claim 1, further comprising:
a partial reflection mirror that transmits a part of the light beam from the diffraction grating and reflects another part of the light beam.

10. A method of controlling a semiconductor laser device, the semiconductor laser device including:
a plurality of optical amplifiers that each emit a light beam;
a diffraction grating that receives the light beam from each of the plurality of optical amplifiers; and
a rotary mirror that is rotatable and is disposed in an optical path between the plurality of optical amplifiers and the diffraction grating,
the method of controlling the semiconductor laser device comprising:
determining a current to be applied to the plurality of optical amplifiers; and rotating the rotary mirror in accordance with the current applied, wherein
an angle of incidence of the light beam on the diffraction grating changes in accordance with the current applied.

* * * * *